United States Patent
Wyatt et al.

(10) Patent No.: US 10,997,663 B1
(45) Date of Patent: May 4, 2021

(54) PROACTIVE WEATHER EVENT COMMUNICATION SYSTEM AND METHOD

(71) Applicant: State Farm Mutual Automobile Insurance Company, Bloomington, IL (US)

(72) Inventors: Amber Wyatt, Bloomington, IL (US); Joe Mora, Bloomington, IL (US); John H. Jenkins, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 826 days.

(21) Appl. No.: 15/056,705

(22) Filed: Feb. 29, 2016

Related U.S. Application Data

(60) Provisional application No. 62/234,393, filed on Sep. 29, 2015.

(51) Int. Cl.
G06Q 40/08 (2012.01)
G06Q 50/16 (2012.01)

(52) U.S. Cl.
CPC .......... *G06Q 40/08* (2013.01); *G06Q 50/163* (2013.01)

(58) Field of Classification Search
CPC ..................................................... G06Q 40/08
See application file for complete search history.

(56) References Cited

U.S. PATENT DOCUMENTS

| | | | |
|---|---|---|---|
| 5,903,873 A * | 5/1999 | Peterson | G06Q 10/10 705/4 |
| 6,590,529 B2 | 7/2003 | Schwoegler | |
| 6,816,878 B1 | 11/2004 | Zimmers et al. | |
| 7,949,548 B2 | 5/2011 | Mathai et al. | |
| 8,280,633 B1 | 10/2012 | Eldering et al. | |
| 8,386,280 B2 | 2/2013 | Mathai et al. | |
| RE44,535 E | 10/2013 | Zimmers et al. | |
| 8,606,512 B1 | 12/2013 | Bogovich et al. | |
| 8,666,786 B1 | 3/2014 | Wirz et al. | |
| 8,996,303 B1 | 3/2015 | Bogovich et al. | |
| 9,020,751 B1 | 4/2015 | Bogovich et al. | |
| 9,049,168 B2 | 6/2015 | Jacob et al. | |
| 10,163,164 B1 * | 12/2018 | Tofte | B64D 47/08 |

(Continued)

FOREIGN PATENT DOCUMENTS

KR 101454547 B1 10/2014
WO 2010062899 A1 6/2010

*Primary Examiner* — Kito R Robinson
*Assistant Examiner* — Shacole C Tibljas
(74) *Attorney, Agent, or Firm* — Armstrong Teasdale LLP

(57) ABSTRACT

A weather event computing device for transmitting weather notifications to policyholders is provided. The weather event computing device receives, from a weather reporting device, weather data for a region. The weather event computing device (i) determines from the weather data that the region is expected to experience a weather event, and (ii) identifies an insured property associated with the policyholder located within the region. A notification is transmitted to the policyholder's mobile device, advising the policyholder that the property may be impacted by the weather event. Pre and post-event drone or other aerial image data of insured properties may be used to estimate insurance claims for the insured, and facilitate prompt payout of insurance monies to those displaced or otherwise impacted by a weather event.

18 Claims, 5 Drawing Sheets

(56) References Cited

U.S. PATENT DOCUMENTS

| | | |
|---|---|---|
| 2004/0010372 A1 | 1/2004 | Schwoegler |
| 2007/0112788 A1* | 5/2007 | Kobza .................. G06Q 10/06 |
| 2009/0292470 A1 | 11/2009 | Curry |
| 2013/0132127 A1 | 5/2013 | Mathai et al. |
| 2014/0052479 A1 | 2/2014 | Kawamura |
| 2015/0046194 A1* | 2/2015 | Waddell ................ G06Q 40/04 |
| | | 705/4 |
| 2015/0073834 A1* | 3/2015 | Gurenko ............... G06Q 10/10 |
| | | 705/4 |
| 2015/0180708 A1 | 6/2015 | Jacob et al. |
| 2015/0348203 A1 | 12/2015 | Taylor |
| 2016/0063642 A1* | 3/2016 | Luciani ................ G06Q 40/08 |
| | | 705/4 |
| 2017/0039307 A1* | 2/2017 | Koger ................... G06F 30/23 |

* cited by examiner

PROACTIVE WEATHER EVENT COMMUNICATION SYSTEM AND METHOD

CROSS-REFERENCE TO RELATED APPLICATIONS

This application claims the benefit of priority of U.S. Provisional Patent Application Ser. No. 62/234,393, filed Sep. 29, 2015, the contents of which are hereby incorporated by reference, in its entirety and for all purposes, herein.

FIELD OF THE INVENTION

The present disclosure relates to a proactive weather event communication system and method and, more particularly, to network-based system and method for proactively communicating with policyholders about weather events and losses resulting from such weather events.

BACKGROUND

Weather events may include severe weather conditions, such as hurricanes, floods, and tornados. Other weather events may include wildfires and earthquakes. These weather events may cause damage to property in an effected area. Damage to a residence may reduce a value of the residence, result in replacement costs for parts (e.g., broken windows), and/or increase insurance costs. In the event of a crisis or an emergency, such as, for example, any of these weather events, individuals who are not aware of the crisis or emergency event may need to be notified of the event.

At least some known notification systems may notify a resident of an area that may be potentially impacted by weather events. However, these known notification systems may not provide advice on how to deal with the weather events (e.g., safe locations where an individual may go during or after the weather events, or how the individual can help protect a piece of property). Accordingly, individuals who receive notifications from these known systems may be unsure as to what to do, and/or where to go during or after the weather events. In addition, individuals that evacuate an area may not know if the property has been damaged by the weather events because these known systems are unable to provide post-weather updates regarding specific pieces of property.

Moreover, notifications received from these known systems may not be timely received (e.g., an individual may not receive the notification until during or after the weather event). For instance, an individual may not receive a severe weather watch or warning issued by the National Weather Service (NWS) until after the severe weather has passed. Accordingly, the individual may receive the notification too late for the notification to be useful for the individual.

BRIEF SUMMARY

The present embodiments may provide, inter alia, an Event Based Proactive Customer Communication Portal. A system and method may predict storms before they hit, and once the weather event hits, the path of the storm may be analyzed to identify impacted insurance policy holders or home owners. Proactive notifications may be transmitted to insurance customers that may include a direct link embedded within to leads to an online portal associated with an insurance provider or other entity. The portal display post event images and data to assist the customers in initiating the claim process and ensure the resources are proactively displayed to assist customers from recovering from the unexpected.

With insured's permission or affirmative consent, an insurance provider remote server may develop or build a data base that stores information about insured properties both pre-event and post-event to facilitate handling insurance claims. For instance, with the customer's permission, drone image data associated with an insured home may be gathered before, during, and after a weather event or catastrophe. The remote server may be configured to proactively notify customers as a potential weather event is being forecasted to assist them in preparing for the weather event.

When the post-event aerial images and data are received at the remote server, the images may be stored and attached to the individual policy owner. The remote server may proactively message policyholders in a method that they prefer (email or text) and provide them a direct link to an online insurance account. Once logged, images may be displayed online that depict the insured property and resources to assist in recovering from the unexpected. The online account may allow an insured to file an insurance claim online. Additionally, the remote server may perform a severity analysis for each property based upon comparison of before and after images (e.g., pre-event images versus post-event images). The remote server may identify those residents that have a uninhabitable home and even provide them the option of entering their bank information, or having stored bank information retrieved from a memory, to get living expenses directly deposited without waiting for resources to be deployed and appointments setup for physical inspections. For instance, an insurance policy may provide for temporary accommodations, such as for hotel expenses. Those monies may be electronically transferred to the customer promptly to assist them in dealing with the catastrophe.

In one aspect, a weather event computing device for transmitting at least one weather notification to a policyholder may be provided. The weather event computing device may include a processor and a memory. The processor may be programmed to receive, from a weather reporting device, weather data for a region that includes at least one candidate property associated with the policyholder. The processor may also be programmed to determine from the weather data that the region is expected to experience a weather event. The processor may be programmed to determine at least one candidate property associated with the policyholder located within the region expected to experience a weather event. The processor may be further programmed to transmit a notification in near real time to the policyholder advising the policyholder that the candidate property is likely to experience the weather event.

In another aspect, a computer-implemented method for transmitting at least one weather notification to a policyholder may be provided. The method may be implemented using a weather event computing device including at least one processor in communication with a memory. The weather event computing device may be in communication with a weather reporting device, an imagery transmission device, and an insurance computing device. The method may include receiving, from a weather reporting device, weather data for a region that includes at least one candidate property associated with the policyholder. The method may also include determining from the weather data that the region is expected to experience a weather event. The method may include determining at least one candidate property associated with the policyholder located within the region expected to experience a weather event. The method may include transmitting a notification in near real time to the policyholder advising the policyholder that the candidate property is likely to experience the weather event.

In yet another aspect, a non-transitory computer-readable storage media having computer-executable instructions embodied thereon for transmitting at least one weather notification to a policyholder may be provided. When executed by at least one processor, the computer-executable instructions may cause the processor to receive, from a weather reporting device, weather data for a region that includes at least one candidate property associated with the policyholder. The computer-executable instructions may also cause the processor to determine from the weather data that the region is expected to experience a weather event. The computer-executable instructions may cause the processor to determine at least one candidate property associated with the policyholder located within the region expected to experience a weather event. The computer-executable instructions may further cause the processor to transmit a notification in near real time to the policyholder advising the policyholder that the candidate property is likely to experience the weather event.

In still another embodiment, a non-transitory computer-readable storage media having computer-executable instructions embodied thereon for processing an insurance claim may be provided. When executed by at least one processor, the computer-executable instructions may cause the processor to receive, from an online account module, an insurance claim for a property loss to a candidate property resulting from a weather event. The insurance claim may be initiated by a policyholder using the online account. The computer-executable instructions may cause the processor to receive, from the online account module, at least one media file of the candidate property and a damage severity level. The computer-executable instructions may further cause the processor to process the insurance claims for the property loss based at least in part on the at least one media file of the candidate property and the severity level.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown.

FIG. 1 illustrates an exemplary proactive weather event communication system.

FIG. 2 illustrates an exemplary configuration of a computing device that is part of the proactive weather event communication system shown in FIG. 1.

FIG. 3 illustrates an exemplary computer-implemented method for the proactive weather event communication system shown in FIG. 1.

FIG. 4 depicts an exemplary online policy account page displaying an insured property and other online resources, as described in FIGS. 1-3.

FIG. 5 depicts an exemplary online deposit request page enabling a policyholder to request that funds be deposited to a bank account of the policyholder, as described in FIGS. 1-3.

Figure 1:
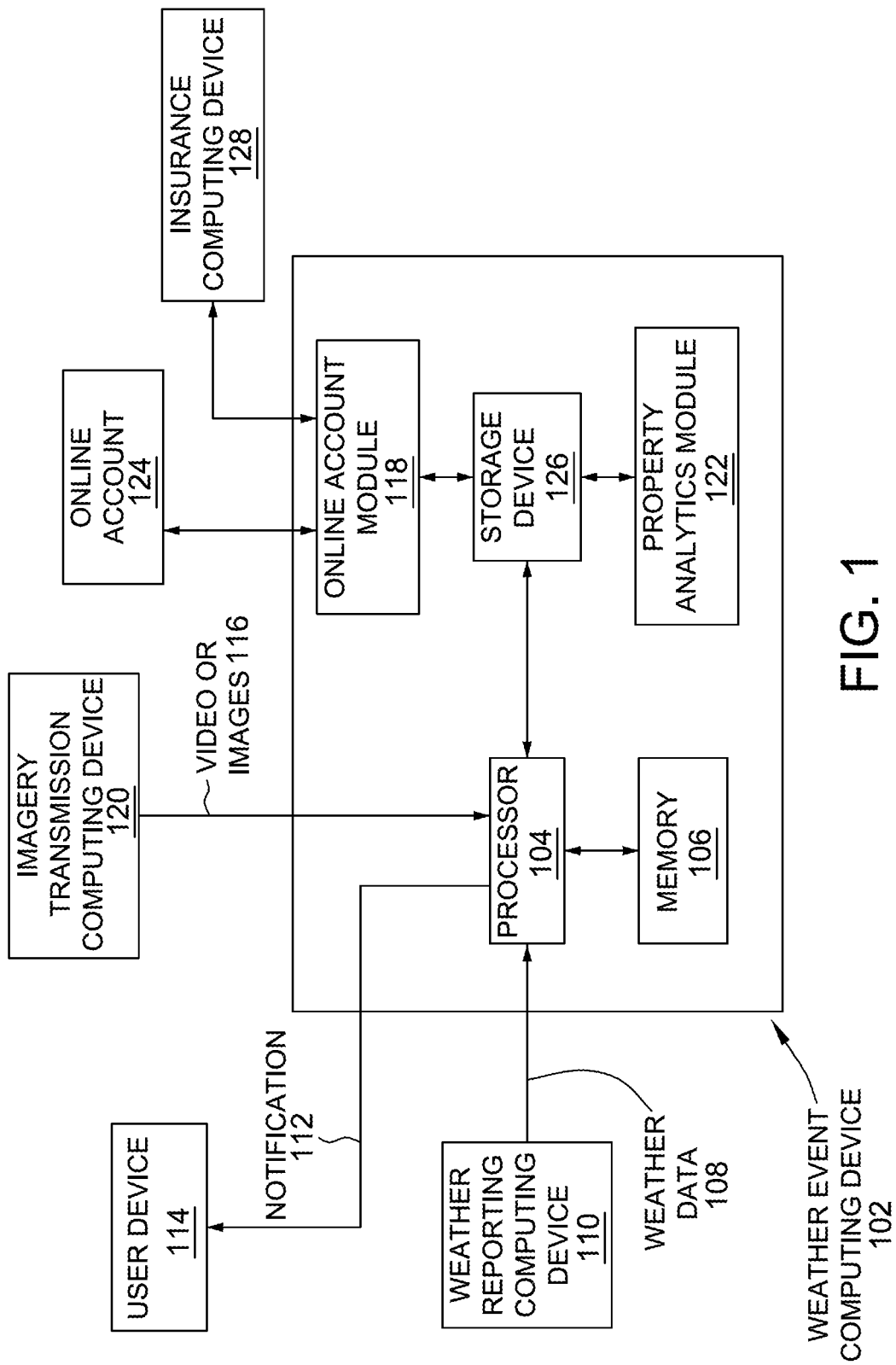
FIGS. 1-5 show exemplary embodiments of the methods and systems described herein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for notifying policyholders about impending weather events including severe weather (e.g., hurricanes, tornados, flooding, etc.), and other natural disasters (e.g., wildfires, earthquakes, etc.). In particular, the systems and methods described herein may be configured to: identify an impending weather event that may impact property insured by an insurance provider for a policyholder; transmit a notification of the impending weather event to the policyholder; provide advice regarding steps the policyholder may take to reduce a risk of loss to the property as a result of the impending weather event; receive images and/or videos of the insured property taken prior to the impending weather event; receive images and/or videos of the insured property taken following the impact of the weather event; determine the severity of loss or damage to the insured property from the weather event; transmit a notification to the policyholder regarding any such loss to the insured property caused by the weather event; and/or provide online resources to the policyholder, including images and/or videos of the insured property post-loss and information to assist in submitting an insurance claim online relating to the loss.

As used herein, the insured property may include real or personal property, including, but not limited to, a residence or a dwelling, or an automobile, a boat, a plane, or any other vehicle. The insured property includes any property which may be covered by an insurance policy issued by an insurance provider. The insurance provider may be an insurance carrier and/or a third party associated with the insurance carrier. The policyholder is a person with a claim or a potential claim for the insured property against an insurance policy provided by the insurance provider.

The system described herein is referred to as a weather event communication system. The exemplary embodiment of the weather event communication system may include a weather event (WE) computing device, which includes at least one processor and a memory, in communication with (i) a weather reporting (WR) computing device configured to transmit weather data and/or weather warnings to the WE computing device to identify an impending weather event that may impact a property insured by an insurance provider for a policyholder, (ii) an imagery transmission (IT) computing device configured to transmit to the WE computing device one or more images and/or videos of the insured property taken before and after the weather event, and/or (iii) at least one user computing device configured to receive from the WE computing device at least one notification of the weather event and losses resulting from the weather event.

The WE computing device may include a storage device, a property analytics (PA) module configured to compare the one or more images and/or videos of the insured property to generate a damage severity level for the insured property, and an online account (OA) module configured to generate an online account specifically for the policyholder. The OA module may be in communication with an insurance computing device, which is configured to process an insurance claim for a property loss.

In the exemplary embodiment, the WE computing device may be in communication with the WR computing device. The WR computing device may be configured to transmit weather data and/or weather warnings to the WE computing device indicating weather events of a region (e.g., a county, a zip code, a city, a state) that includes a property insured by an insurance provider for a policyholder. The weather data may include previous weather data, current weather data, and/or predicted weather data. The weather events may include, but are not limited to, hurricanes, tornados, wildfires, floods, hail, wind, ice, rain, thunderstorms, and snow. The weather data and/or weather warnings may be obtained from a third party, such as the National Weather Service (NWS).

Based upon the weather data received from the WR computing device, the WE computing device may be configured to determine whether a potential weather event may impact an insured property. Impact effects may include, for example, damage to a house, residence, automobile, or other property. In one embodiment, the WE computing device may calculate one or more weather condition scores associated with a likelihood of damage or other undesirable effects to the insured property by the potential weather event. The weather condition scores may be based upon weather data such as, but not limited to, hail size, amount of rain, snow, or ice, and/or wind conditions.

The WE computing device may be configured to determine whether the insured property is located in a region potentially impacted by the weather event. Determining may include, for example, identifying weather events based upon the weather data and/or weather warnings.

If the WE computing device determines that the insured property may be impacted by the weather event, the WE computing device may be configured to transmit to the policyholder associated with the insured property at least one notification indicating the impending weather event. The at least one notification may be transmitted via e-mail, text message, wireless communication or data transmission, and/or automated phone call. In some embodiments, the WE computing device may be further configured to transmit additional information, such as, but not limited to, advice on how to deal with the weather event (e.g., safe locations to which an individual can go during or after the weather event), and advice on how to protect the insured property.

In the exemplary embodiment, the weather event notification is timely sent to and received by the policyholder. In other words, the policyholder receives the notification before being impacted by the weather event. In some embodiments, a notification is transmitted to the policyholder only if the one or more weather condition scores are at or above a certain value.

In the exemplary embodiment, the WE computing device may be configured to receive from an IT computing device one or more images and/or videos of the insured property taken prior to an arrival of the weather event. The WE computing device may be further configured to receive from the IT computing device one or more images and/or videos of the insured property taken after a departure of the weather event. The one or more images and/or videos received by the WE computing device are stored within a memory and/or a storage device of the WE computing device. More particularly, the one or more images and/or videos may be stored in an account data file of the policyholder within the memory and/or a storage device, and is accessible by the policyholder via an online account specifically for the policyholder.

In the exemplary embodiment, the IT computing device, which includes at least one processor and a memory, may be a satellite, a digital camera, an unmanned aerial drone, or some other means capable of capturing images and/or videos of the insured property. Once captured, the IT computing device may transmit the one or more images and/or videos, via a network, to the WE computing device. In one embodiment, the one or more images and/or videos are taken from a manned aircraft and transmitted, via a network, to the WE computing device. In an alternative embodiment, the one or more images and/or videos are obtained by a third party (e.g., Google Maps™, commercial satellite companies, commercial drone companies, etc.) and transmitted by the third party to the WE computing device.

WE computing device may include a property analytics (PA) module, which may include at least one processor and a memory. The PA module may be configured to retrieve from the storage device of the WE computing device the one or more images and/or videos of the insured property and compare the one or more images and/or videos of the insured property taken prior to the arrival of the weather event with the one or more images and/or videos of the insured property taken after the departure of the weather event to determine a damage severity level for the insured property. The PA module may store the damage severity level within the storage device of the WE computing device.

The damage severity level may be based upon the damage incurred to the insured property. In the exemplary embodiment, predefined labels (e.g., low, medium, and high) may be assigned to each level of damage severity based upon an amount of damage incurred to the insured property. For example, the damage severity level is low when there is minimal damage. Conversely, the damage severity level is high when, for example, a house is uninhabitable.

In an alternative embodiment, the PA module may generate a score based upon the damage severity. A range of scores equals a level of damage severity with each level of damage severity classified by a predefined label, such as low, medium, and high. For example, minimal damage to an insured property would generate a low score, which would fall into a low level of damage severity. In another embodiment, the damage severity level may be classified by predefined tiers (e.g., tier one, tier two, tier three, etc.) depending upon the property damage. For example, a house in tier one would be uninhabitable while a house in tier three would only have slight damage.

In the exemplary embodiment, the WE computing device may transmit a notification of a potential property loss to the policyholder, including, but not limited to, a link or hyperlink to the online account of the policyholder. In one embodiment, the link or hyperlink will direct the policyholder to a webpage where the policyholder can log into the online account. In some embodiments, the damage severity level may determine or dictate whether a notification of potential property loss is transmitted to the policyholder. For example, where the damage severity level is low, such as when there is minimal damage to the insured property, a notification may not be transmitted to the policyholder.

The damage severity level of one or more properties may also be used to determine where to deploy resources. For example, additional support may be deployed to an area containing multiple properties with high damage severity levels.

The online account may include one or more webpages or an application that provide a policyholder with online resources. The online account may be provided for the policyholder by the insurance provider and may include, but is not limited to, insurance policy information, billing information, coverage information, deductibles and discounts information, forms, and other insurance-related information. The online account may be configured to provide online resources to assist the policyholder in recovering from a property loss, including, but not limited to, emergency contact information, images and/or videos of the insured property, links to local repair companies and service providers, and a link to initiate an insurance claim online for the property loss. The online account may also be configured to display additional information, such as a link to contact an insurance agent. In some embodiments, the online account advertises services and/or displays discounts and specials relating to the repair companies and service providers.

The policyholder may use the online account to initiate an insurance claim online for a property loss. The claim, along with any information submitted by the policyholder to the online account, may be transmitted to the OA module. The OA module may transmits the claim to the insurance computing device. In the exemplary embodiment, the OA module may submit additional information to the insurance computing device, such as, for example, policy information (e.g., policy amount, premium, discount) associated with the policyholder and/or insured property, historical images of the insured property, past claims involving the insured property and/or policyholder, the one or more images and/or videos of the insured property, the damage severity level, the date and/or time of the claim, an estimated amount of damage, and/or an estimated claim amount.

The insurance computing device, which may include at least one processor and a memory, may be implemented by an insurance provider such as an insurance carrier or a third party related to the insurance carrier associated with the insured property. The insurance computing device may use any or all of the received information from the OA module to assist in processing the insurance claim. The insurance computing device may also retrieve any policy information from the insurance carrier or the third party related to the insurance carrier associated with the property to further assist in processing the insurance claim.

In the exemplary embodiment, the insurance computing device may assess the insurance claim based upon the received information, including, but not limited to, the at least one media file of the candidate property and the severity level, and determine an amount payable to the policyholder. In one aspect, a physical inspection of the insured property may be necessary before processing the insurance claim. In some embodiments, the insurance computing device may be configured to populate at least one field of a claims form with the received information. The populated claims form may be used to process the insurance claim.

In the exemplary embodiment, the policyholder may request via the online account that funds be automatically deposited into a bank account of the policyholder. An amount of funds that can be automatically deposited into the bank account may depend upon the damage severity level. For example, if an insured house has a high damage severity level such that the insured house is uninhabitable, the policyholder may be able to request via the online account that funds up to an insurance policy limit be automatically deposited into the bank account. This may occur prior to an insurance claim being processed and/or prior to a physical inspection of the insured property.

The WE computing device may be further configured to produce a map of a region affected by the weather event that displays a location of each insured property in the region. In the exemplary embodiment, the map may be color coded based upon damage severity levels. For example, an area with a high damage severity level may be colored red while an area with a low damage severity level may be colored green.

In another embodiment, the WE computing device may be configured to identify insurance policies associated with a particular insurance agent and produce a map showing locations of insured properties associated with the insurance agent. For example, if an insurance agent has ten client policyholders with properties impacted by the weather event, the insurance agent may view the map to find the locations of the ten properties.

To promote reducing property damage and other undesirable effects due to weather events (and potentially reducing insurance costs associated with properties), the insurance provider may provide insurance-related benefits to one or more insurance policies that may be associated with the insured property. The insurance-related benefits may include, for example, an insurance policy adjustment, an insurance reward offer (e.g., a discount), and/or reduced costs of an insurance policy. In some embodiments, the insurance computing device may be configured to determine the eligibility of an insurance policy for insurance-related benefits. The insurance provider may adjust an insurance policy covering or associated with an insured property based, at least in part, on weather history and property loss history for the insured property. The insurance computing device may then apply any eligible insurance-related benefits to the insurance policy.

At least one of the technical problems addressed by this system may include: (i) limited prediction of weather events for policyholders; (ii) property damage caused by weather events; (iii) difficulty in obtaining information relating to property loss (e.g., lack of notification regarding property loss) and difficulty in initiating an insurance claim online; (iv) lack of proof of property loss and property damage; (v) increased costs from repairing damaged property; and/or (vi) inaccurate measurements of property loss and property damage.

A technical effect of the systems described herein may be achieved by performing at least one of the following steps: (a) receiving, at a WE computing device, weather data and/or weather warnings; (b) determining if the weather data represents one or more weather events; (c) determining that one of the weather events will likely affect a region that includes at least one candidate property insured by an insurance provider for a policyholder; (d) transmitting at least one notification to the policyholder advising of the one weather event potentially impacting a property; (e) receiving one or more images and/or videos of the insured candidate property taken before the one weather event; (f) receiving one or more images and/or videos of the insured candidate property taken after the one weather event; (g) comparing the one or more images and/or videos of the insured candidate property that were taken before and after the one weather event to determine a damage severity level; (h) transmitting a notification to the policyholder advising of potential property loss to the candidate property, wherein the notification includes a link or hyperlink to an online account of the policyholder; (i) configuring the online account specifically for the policyholder to provide resources, such as, but not limited to, emergency contact information, the one or more images and/or videos of the insured property, and a link to initiate an insurance claim online for the property loss; and (j) depending on the severity level, enabling the policyholder to request via the online account that funds be automatically deposited into a bank account of the policyholder.

The technical effect achieved by this system may be at least one of: (i) increased prediction of a weather event; (ii) increased safety of a policyholder and increased preparation for potential property loss caused by the weather event; (iii) reduced property loss and reduced property damage caused by the weather event; (iv) reduced repair costs and reduced costs of an insurance policy; (v) evidence of a property loss caused by the weather event, which may result in better claims handling for the insured and/or the insurance provider; (vi) increased accessibility to online resources to assist the policyholder in recovering from the property loss caused by the weather event; (vii) enhanced awareness of the policyholder of the property loss; and/or (viii) enhanced online resources to assist the policyholder in recovering from the property loss.

I. Exemplary Proactive Customer Communication System

FIG. 1 is an exemplary configuration of proactive weather event communication system 100, in accordance with one exemplary embodiment of the present disclosure. In the exemplary embodiment, system 100 may include WE (weather event) computing device 102, which includes at least one processor 104 in communication with memory 106. WE computing device 102 may be in communication with WR (weather reporting) computing device 110, IT (imagery transmission) computing device 120, and at least one user computing device 114. In the exemplary embodiment, WE computing device 102 further includes OA (online account) module 118, PA (property analytics) module 122, and storage device 126. OA module 118 is in communication with insurance computing device 128. System 100 may include additional, fewer, or alternate components, including those discussed elsewhere herein.

In the exemplary embodiment, WE computing device 102 includes a processor 104 for executing instructions and a memory 106 as described further below. In some embodiments, executable instructions may be stored in memory 106. Processor 104 may include one or more processing units (e.g., in a multi-core configuration). Memory 106 may be any device allowing information such as executable instructions and/or other data to be stored and retrieved. Memory 106 may include one or more computer-readable media.

Weather data, images and/or videos of insured properties, property locations, policy information, policyholder information, contact information (e.g., e-mails, phone numbers, etc.) and addresses, and/or other information about weather, properties, and policyholders, as described in the present disclosure, may be stored in memory 106 and/or storage device 126. Each property location may be associated with a street address or a latitude and longitude (e.g., GPS coordinates) of the property location.

In the exemplary embodiment, WE computing device 102 may be configured to receive weather data 108 and/or one or more weather warnings 108 of one or more regions from WR computing device 110. The weather data may include previous weather data, current weather data, and/or predicted weather data. The weather condition may include, but is not limited to, hail, ice, wind, rain, thunderstorms, and/or snow. In the exemplary embodiment, the weather data may be collected from a region (e.g., a county, a zip code, a city, a state) that includes at least one insured property associated with a policyholder. In some embodiments, the weather data may be collected from a region that does not include an insured property. For example, the weather data may include weather conditions that are moving towards the region including one or more insured properties.

In the exemplary embodiment, WE computing device 102 may be configured to receive one or more weather warnings indicating weather events from WR computing device 110. WE computing device 102 may not receive the one or more weather warnings until weather events are identified.

Based upon the weather data and/or weather warnings received from WR computing device 110, WE computing device 102 may be configured to forecast weather, which may include identifying one or a variety of weather events such as tornadoes, hurricanes, thunderstorms, wild fires, flooding, hail storms, ice storms, fog conditions, lightning storms, showers, snow storms, blizzards, high winds, winds aloft, rapidly rising or rapidly falling barometric pressure or other such weather patterns or conditions.

WE computing device 102 may be further configured to determine if the weather data and/or weather warnings indicate any weather events that may affect an insured property. Determining may include, for example, identifying weather events based upon the weather data and/or weather warnings. WE computing device 102 may continue to receive weather data and/or weather warnings from WR computing device 110 even after WE computing device 102 determines that the insured property may not be affected by weather events. In some embodiments, WE computing device 102 may automatically identify weather events based upon one or more weather warnings.

In another embodiment, WE computing device 102 may be configured to generate one or more weather condition scores based upon the weather data and/or weather warnings. The weather condition scores may represent a likelihood of a weather event affecting or not affecting the insured property. The weather condition scores may be based upon weather data such as, but not limited to, hail size, amount of snow or rain or ice, and/or wind conditions. In at least one embodiment, each weather condition score may be associated with a specific weather event (e.g., hail size, extreme hot or cold temperature, precipitation level, and/or wind speed). The weather data, the weather warnings, the weather condition scores, the property location, and/or the property type may indicate that a weather event may affect the insured property and/or insureds or family members.

In the exemplary embodiment, WE computing device 102 may be configured to determine whether there is at least one insured property located in an area or region potentially impacted by a weather event. For example, WE computing device 102 may be configured to search for insured properties located in a particular city or county, or within a defined boundary that may be impacted by the potential weather event. Insured properties may also be identified based upon street addresses or latitude and longitude coordinates (e.g., GPS coordinates).

If WE computing device 102 determines that an insured property associated with a policyholder may be impacted by the weather event, WE computing device 102 may be configured to transmit one or more notifications 112 of the weather event to a user device 114 of the policyholder, such as via wireless communication or data transmission to a mobile device. Forms of notification may include e-mail, text message, automated phone call, social media (e.g., Twitter, Facebook, etc.), or other forms of communication. User device 114 may be a computing device such as a smartphone, tablet, laptop, phablet, notebook, netbook, desktop computer, wearable electronic, smart glasses, smart vehicle, or smart watch.

In the exemplary embodiment, WE computing device 102 may be configured to receive from IT computing device 120, via a network, one or more images 116 and/or one or more videos 116 taken of the insured property and store them into memory 106 and/or storage device 126. The one or more images and/or videos 116 are of the insured property taken before and/or after the weather event. The network may comprise a wired network, such as the Internet or an intranet, or any equivalent network such as a wide area network, a local area network, or a public or private wireless network.

PA module 122, which may include at least one processor and a memory, is configured to retrieve the one or more images and/or videos from storage device 126 and compare the one or more images and/or videos taken prior to the arrival of the weather event with the one or more images and/or videos of the insured property taken after the departure of the weather event to determine a damage severity level for the insured property, as described in greater detail above. PA module 122 may be configured to store the damage severity level in storage device 126.

WE computing device 102 may be configured to transmit at least one notification 112 of potential property loss to user device 114. Notification 112 may also include a link or hyperlink to an online account 124 of the policyholder. In some embodiments, WE computing device 102 may be configured to provide additional information in notification 112, such as, but not limited to, severity of property loss, images and/or videos of the insured property, weather information, power outage information, and emergency contact information. Forms of notification may include e-mail, text message, automated phone call, social media (e.g., Twitter, Facebook, etc.), or other forms of communication.

Online account 124 may be provided for the policyholder by the insurance provider and may display policy-related information in one or more webpages or an application. Policy-related information, including, but not limited to, insurance policy information, billing information, coverage information, deductibles and discounts information, forms, and other insurance-related information, may be stored in storage device 126. OA module 118, which includes at least one processor and a memory, is configured to retrieve the policy-related information from storage device 126 to generate online account 124 specific to the policyholder. OA module 118 may be further configured to display, via online account 124, the one or more images and/or videos of the insured property that are stored in storage device 126. The one or more images and/or videos displayed in online account 124 may be of the insured property before the weather event; during the weather event; after the weather event; or before, during, and after the weather event.

Online account 124 may further includes links or hyperlinks to various online resources, for example, contact information (e.g., emergency phone numbers), direct links to important websites (e.g., utility companies, local government, hospitals, etc.), online messaging with an insurance agent, and a link to file an insurance claim online. In some embodiments, storage device 126 stores additional information on the insured property, such as claims history, weather history, property loss history, information on the insured property, information on an insurance policy associated with the insured property, information on the policyholder associated with the insured property, and/or additional information relevant to the insured property and/or the policyholder. OA module 118 may be further configured to retrieve the additional information from storage device 126 to display via online account 124.

In the exemplary embodiment, the policyholder may use online account 124 to initiate an insurance claim online for a property loss. The claim data, along with any other information submitted by the policyholder to online account 124, is transmitted to the OA module 118. Insurance claim data may be generated in response to the insurance claim initiated by the policyholder using online account 124. OA module may then submit the insurance claim data to insurance computing device 128. The insurance claim data may include additional information about the insurance policy and/or policyholder to insurance computing device 128. Insurance computing device 128 may also retrieve any policy information from an insurance carrier or a third party related to the insurance carrier associated with the property to further assist in processing the insurance claim. In the exemplary embodiment, insurance computing device 128 may process the insurance claim based upon received information. Insurance computing device 128 may be a computing device as describe herein, or other computing devices.

In one embodiment, insurance computing device 128 may be configured to determine if an insurance policy associated with an insured property is eligible for insurance-related benefits. This may be based upon, for example, how often the insured property is impacted by weather events. Insurance computing device 128 may apply any eligible insurance-related benefits to the insurance policy.

In addition, online account 124 may enable the policyholder to request that funds be automatically deposited by an insurance provider into a bank account associated with the policyholder, depending upon the damage severity level. For example, the policyholder may immediately need funds for living expenses and cannot wait for an insurance claim to be processed and/or the insured property to be physically inspected for damage. In some embodiments, the amount of funds that can be automatically deposited to the bank account of the policyholder is based upon the damage severity level. For example, where the damage severity level is high, the policyholder may request that funds be automatically deposited up to the insurance policy limit. Conversely, where the damage severity level is low, the policyholder may not be able to request an automatic deposit of funds.

II. Exemplary Weather Event Computing Device

Figure 2:
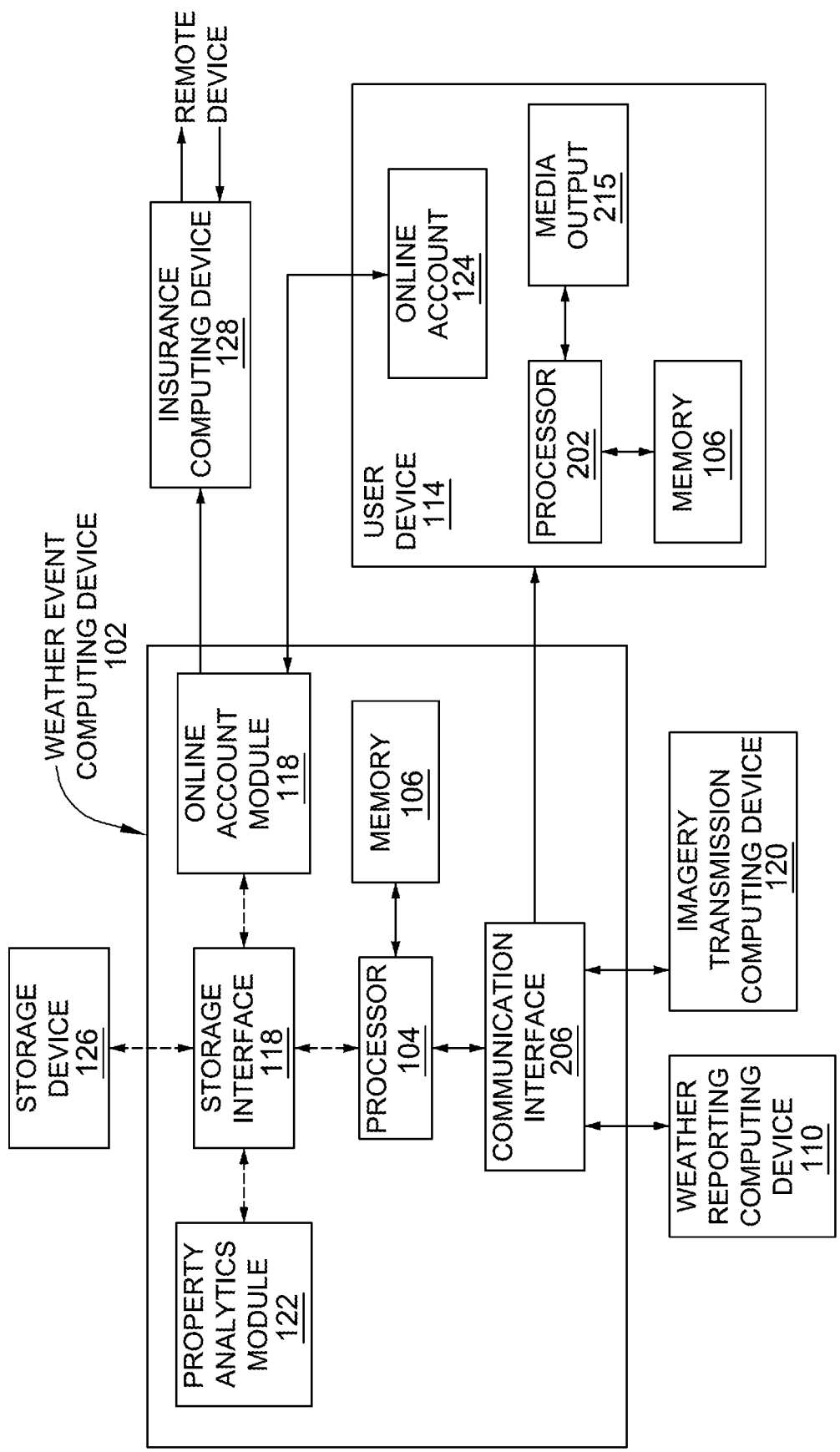

FIG. 2 illustrates an exemplary configuration of WE (weather event) computing device 102, which may include storage device 126, PA (property analytics) module 122, and OA (online account) module 118, in communication with WR (weather reporting) computing device 110, IT (imagery transmission) computing device 120, and at least one user computing device 114, which are part of the proactive weather event communication system shown in FIG. 1.

WE computing device 102 may include a processor 104 for executing instructions. Instructions may be stored in a memory area 106, for example. Processor 104 may include one or more processing units (e.g., in a multi-core configuration) for executing instructions. It should also be appreciated that upon initiation of a computer-based method, various instructions may be executed during initialization.

Some operations may be required in order to perform one or more processes described herein, while other operations may be more general and/or specific to a particular programming language (e.g., C, C #, C++, Java, or other suitable programming languages, etc.).

Processor 104 may be operatively coupled to a communication interface 206 such that WE computing device 102 is capable of communicating with remote devices such as WR computing device 110, IT computing device 120, and at least one user computing device 114. WE computing device 102 may be capable of communicating with WR computing device 110 to receive weather data and/or weather warnings. WE computing device 102 may be capable of communicating with IT computing device 120 to receive one or more images and/or videos of the insured property. WE computing device 102 and the remotes devices may be connected through a communications network, such as the Internet or an intranet, or any equivalent network such as a wide area network, a local area network, or a public or private wireless network.

WE computing device 102 may be configured to transmit to user device 114 one or more notifications 112 indicating weather events and/or property loss, as described in FIG. 1. OA module 118 may be configured to transmit claims data to insurance computing device 128 for claim processing.

User device 114 may include a processor 104 for executing instructions and a memory area 106. Memory area 106 may be any device allowing information such as executable instructions and/or other data to be stored and retrieved. In one embodiment, user device 114 may be a mobile device or other computer including a web browser, such that online account 124 is accessible to the policyholder via user device 114. User device 114 may be connected to the internet though many interfaces including a network, such as a local area network (LAN) or a wide area network (WAN), a dial in connections, cable modems, and special high-speed ISDN lines. User device 114 could be any device capable of interconnecting to the internet, including a web-based phone, personal digital assistant (PDA), or other web-based connectable equipment capable of executing stored computer-readable instructions.

User device 114 may also include at least one media output component 215 for presenting information to the policyholder. Media output component may be any component capable of conveying information, including displaying online account 124, to the policyholder via a user interface. The user interface may include, among other possibilities, a web browser and client application. In some embodiments, media output component includes an output adapter such as a video adapter. An output adapter is operatively coupled to processor 104 and operatively coupleable to an output device such as a display device (e.g., a liquid crystal display (LCD), organic light emitting diode (OLED) display, cathode ray tube (CRT), or "electric ink" display). User device 114 may also include an input device for receiving input from the policyholder. Input device may include, for example, a keyboard, a pointing device, a mouse, a touch sensitive panel (e.g., a touch screen).

Processor 104 may also be operatively coupled to storage device 126. In addition, PA module 122 and/or OA module 118 may be coupled to storage device 126. In some embodiments, processor 104 may be coupled to PA module 122 and/or OA module 118. Storage device 126 may be any computer-operated hardware suitable for storing and/or retrieving data.

In some embodiments, storage device 126 may be integrated in computing device 102. For example, computing device 102 may include one or more hard disk drives as storage device 126. In other embodiments, storage device 126 may be external to computing device 102 and may be accessed by a plurality of computing devices 102. For example, storage device 126 may include multiple storage units such as hard disks or solid state disks in a redundant array of inexpensive disks (RAID) configuration. Storage device 126 may include a storage area network (SAN) and/or a network attached storage (NAS) system.

In some embodiments, processor 104, OA module 118, and/or PA module 122 are operatively coupled to storage device 126 via a storage interface 210. Storage interface 210 may be any component capable of providing processor 104, OA module 118, and/or PA module 122 with access to storage device 126. Storage interface 210 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 104, OA module 118, and/or PA module 122 with access to storage device 126.

Memory area 106 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

III. Exemplary Proactive Weather Event System Flow

Figure 3:
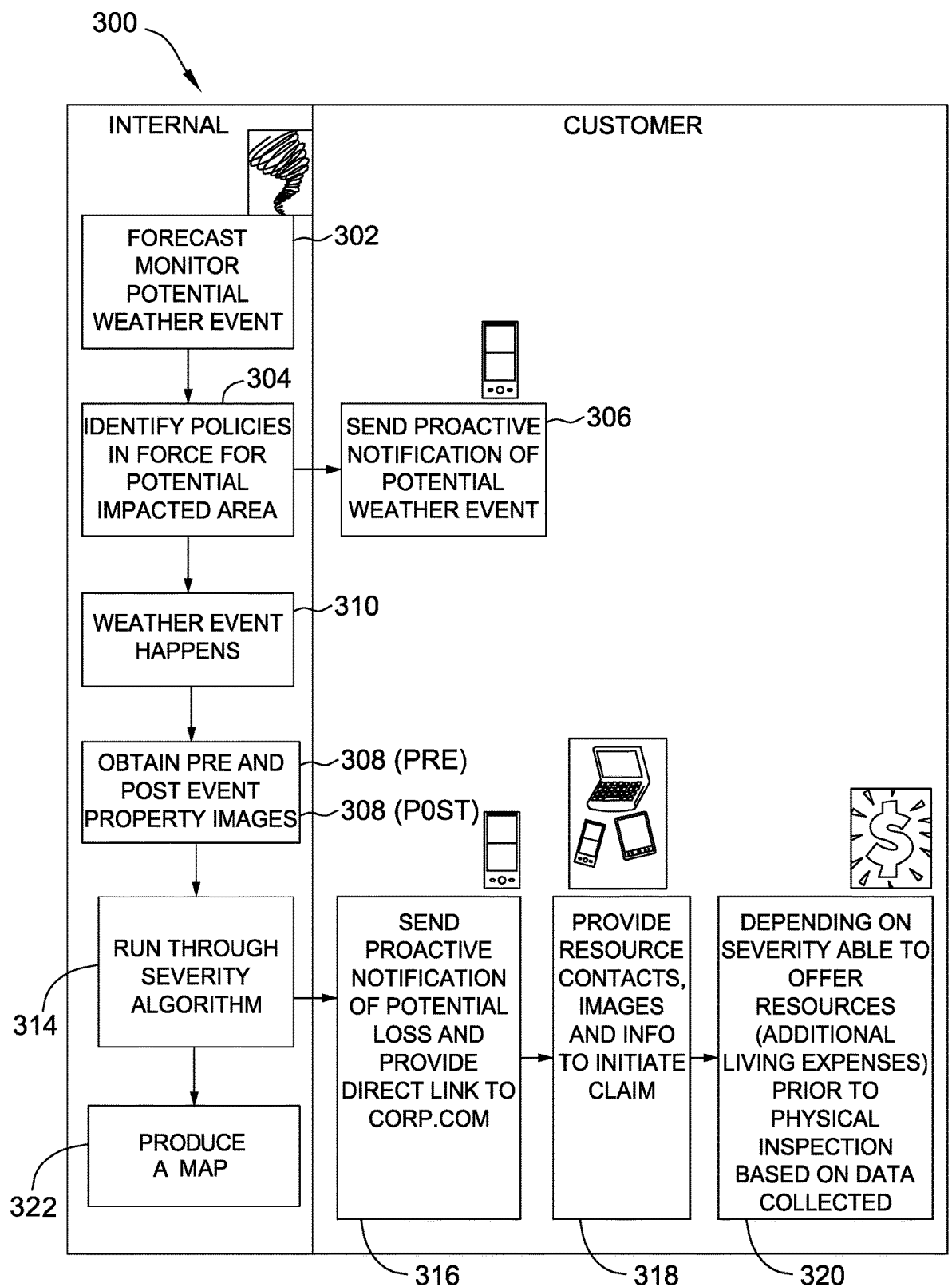

FIG. 3 illustrates an exemplary computer-implemented method 300 for the proactive weather event communication system. Method 300 may be implemented by a WE (weather event) computing device, including a PA (property analytics) module and an OA (online account) module, in communication with a WR (weather reporting) computing device, an IT (imagery transmission) computing device, and at least one user computing device, shown in FIG. 1 and FIG. 2. Method 300 may include additional, fewer, or alternate actions, including those discussed elsewhere herein. Method 300 may be implemented via various local or remote processors, and/or computer-executable instructions stored on non-transitory computer-readable media or medium.

Method 300 may begin with the WE computing device configured to receive weather data from the WR computing device indicating a weather condition of a region. The weather data may include previous weather data, current weather data, and/or predicted weather data. A weather condition may include, but is not limited to, hurricane, tornados, wildfires, floods, hail, wind, ice, rain, thunderstorms, and snow (e.g., weather events). The WE computing device may be configured 302 to identify a weather event that may impact an insured property. The WE computing device may be further configured to monitor the weather event for changes, arrival and/or departure.

The WE computing device may be configured to determine 304 whether a property insured by an insurance provider for a policyholder is located in a region potentially impacted by the weather event. Determining may include, for example, identifying weather events based upon the weather data and/or the weather warning.

If the WE computing device determines that an insured property may be impacted by the weather event, the WE computing device may be configured to transmit 306 a notification to a user computing device of a policyholder associated with the insured property indicating the impending weather event. In some embodiments, the WE computing device may also be configured to transmit additional information in the notification, such as, but not limited to, advice on how to deal with the weather event.

The WE computing device may be configured to receive 308 from the IT computing device one or more images and/or videos of the insured property taken prior to the arrival of the weather event. The WE computing device may be further configured to receive 312 from the IT computing device one or more images and/or videos of the insured property taken after the departure of the weather event. The images and/or video are stored within a memory and/or a storage device within the WE computing device. The images and/or video may be obtained by satellite, on land, unmanned aerial drone, manned aircraft, or some other means capable of capturing images and/or videos of the insured property, and stored on the IT computing device before being transferred to the WE computing device.

The PA module compares 314 may be configured to retrieve the one or more images and/or videos of the insured property from the storage device and compare the one or more images and/or videos of the insured property taken prior to the arrival of the weather event with the one or more images and/or videos of the insured property taken after the departure of the weather event to determine a damage severity level for the insured property. In one embodiment, the WE computing device may be configured to use the damage severity level to determine whether to transmit a notification of potential property loss to the policyholder.

The WE computing device may transmit 316 a notification of a potential property loss to the user computing device of the policyholder. The notification may include, but not limited to, a link or hyperlink to a webpage where the policyholder may log into an online account of the policyholder. The online account 318 may be configured to provide resources to assist the policyholder in dealing with the property loss, such as, but not limited to, emergency contact information, the one or more images and/or videos of the insured property, and a link or hyperlink to initiate an insurance claim online. The account may further be configured to indicate additional information, such as a link to contact an insurance agent and insurance policy information.

Depending upon the severity level, the policyholder may request 320 via the online account that funds be automatically deposited into a bank account of the policyholder. This may be performed prior to the insurance claim being processed and/or a physical inspection of the insured property.

The WE computing device may further produce 322 a map of a region affected by the weather event that displays a location of each insured property in the region. In the exemplary embodiment, the map may be color coded based upon damage severity levels. For example, an area with a high damage severity level may be colored red while an area with a low damage severity level may be colored green.

In some embodiments, the WE computing device may further identify insurance policies associated with a particular insurance agent and produce 322 the map showing locations of insured properties associated with the insurance agent. For example, if an insurance agent has ten client policyholders with properties impacted by the weather event, the insurance agent may view the map to find the locations of the ten properties.

Figure 4:
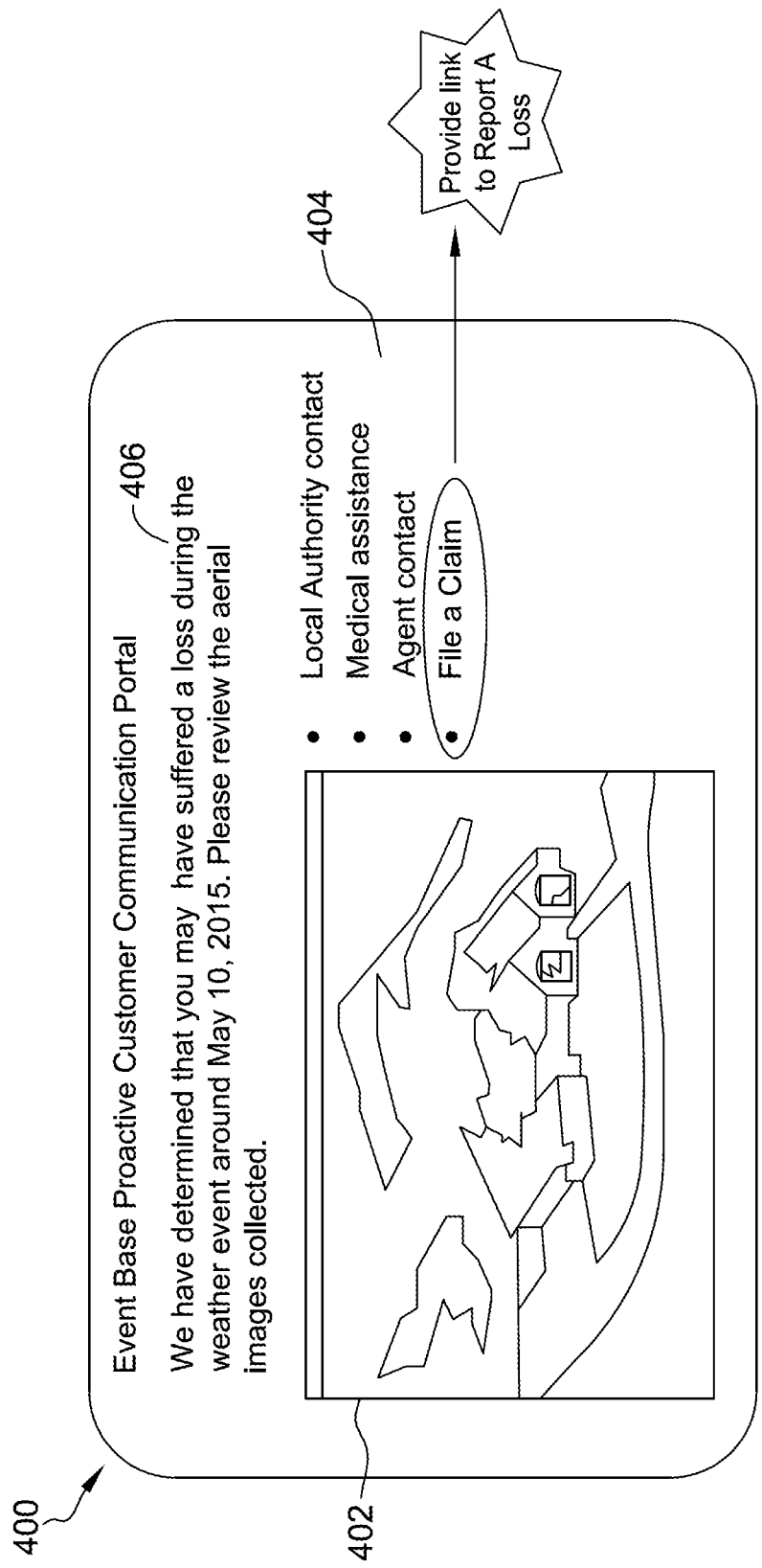

IV. Exemplary Online Policy Account Page Displaying an Insured Property and Other Online Resources FIG. 4 depicts an exemplary embodiment of an online account page 400 of online account 124. Online account page 400 may be displayed as a webpage or an application. Online account page 400 displays one or more images and/or videos of an insured property and links to resources, as described in FIGS. 1-3.

In the exemplary embodiment, a notification sent to a policyholder may provide a direct link or hyperlink to online account page 400. In an alternative embodiment, a notification sent to the policyholder may provide a direct link or hyperlink to a homepage of online account 124 specific to the policyholder. In still another embodiment, a notification sent to the policyholder may provide a direct link or hyperlink to a login page of online account 124. The login page may also be accessed via the World Wide Web.

Online account page 400 may also be accessed via a link in online account 124. Online account 124 and/or online account page 400 may include additional, fewer, or alternate features, including those discussed elsewhere herein. Online account 124 and/or online account page 400 may be implemented via various local or remote processors, and/or computer-executable instructions stored on non-transitory computer-readable media or medium.

In the exemplary embodiment, online account page 400 may be configured to display image 402 of the insured property. In an alternative embodiment (not shown), online account page 400 may be configured to display multiple images of the insured property. Online account page 400 may further include links 404 to resources, such as, but not limited to, local authority contacts, medical assistance, insurance agent contact, and a link to file a property insurance claim. Online account page 400 may be further configured to display introduction paragraph 406 advising the policyholder of potential property loss from a weather event. In some embodiments (not shown), online account page 400 may be configured to display additional information, such as policy information and weather information.

Figure 5:
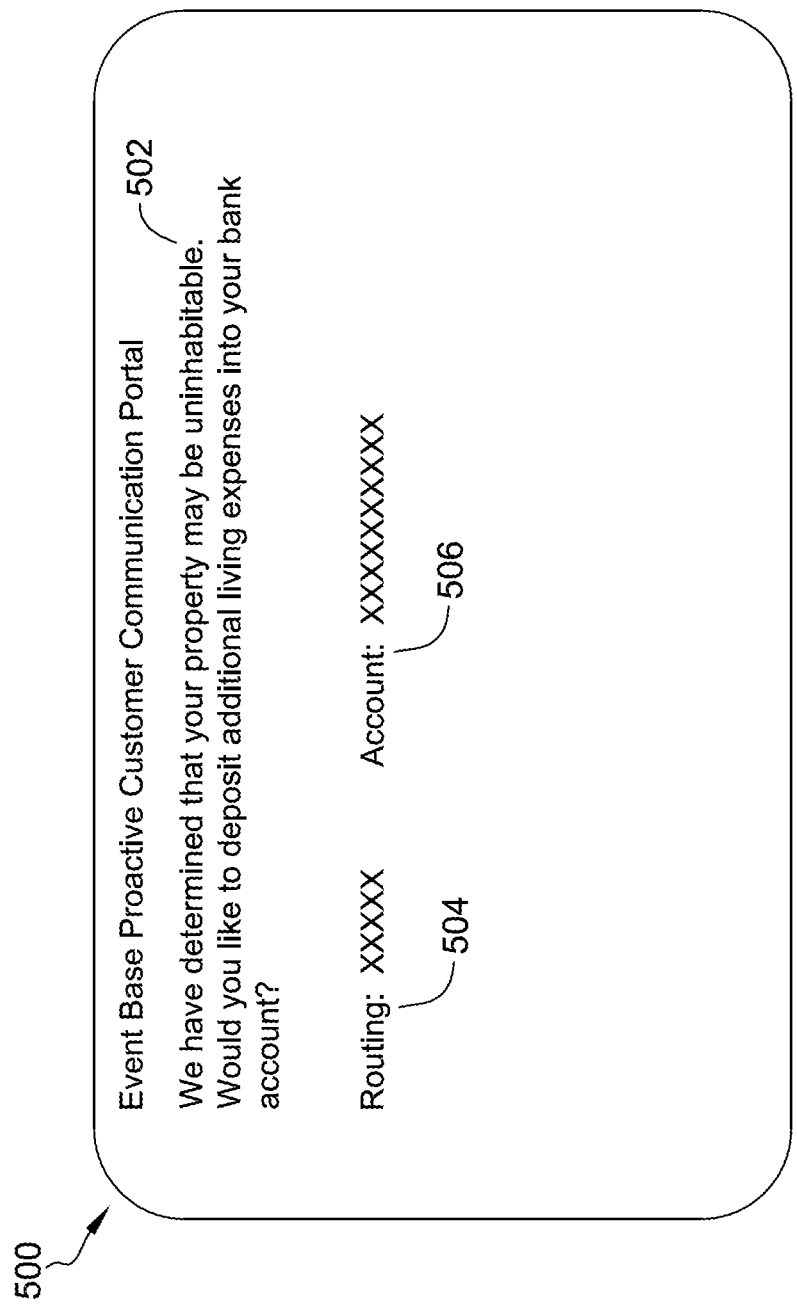

V. Exemplary Online Policy Account Page Enabling Policyholder to Request Fund Transfer FIG. 5 depicts an exemplary embodiment of an online deposit request page 500 of online account 124 for enabling a policyholder to request that funds be automatically deposited to a bank account of the policyholder, as described in FIGS. 1-3. Online deposit request page 500 may be displayed as a webpage or an application. Online deposit request page 500 may also be accessed via a link in online account 124 and/or in online account page 400.

In the exemplary embodiment, online deposit request page 500 may be configured to display an introduction paragraph 502 inquiring whether the policyholder would like to have funds automatically deposited to the bank account of the policyholder. In the exemplary embodiment, online deposit request page 500 may be configured to display the routing number 504 and account number 506 of the bank account. In an alternative embodiment, the policyholder may be able to enter routing number 404 and account number 406 into online deposit request page 500.

VI. Exemplary Embodiments

In one aspect, the present embodiments relate to monitoring weather events, and notifying insurance customers of potential insurance claims, and/or prepared proposed insurance claims for customer online review and approval. For instance, a drone or UAV (Unmanned Aerial Vehicle) may capture pre-event or pre-insurance claim data, such as with the customer's permission or affirmative consent. After which, a remote server may determine when to deploy subsequent drones to a catastrophe area or other area impacted by a weather event, such as before, during, and/or after the weather event. The drones may be directed based upon the GPS location or coordinates of the weather event or those areas impacted.

If damage to insured properties or homes is expected or identified by analysis of drone, satellite, or other aerial image (and/or other data) collected, impacted insured properties may be identified. For instance, insured properties affected by the weather event may be identified by zip code, GPS coordinates, or counties/cities impacted by the weather event. For insured properties, e.g., insured buildings or homes, within an area associated with the path of the weather event, the insured's or home owners may be identified with their permission, such as by accessing their insurance policy or a related online account.

Electronic notifications may be pushed to the insured's mobile device notifying them that they may have a potential insurance claim. The electronic notification may include a link to an insurance provider website with information and/or virtual claim forms that allow the insured to fill out and electronically submit an insurance claim.

Additionally or alternatively, the insurance provider remote server may prepare an estimated insurance claim based upon comparison of insured property pre-event and post-event drone or other aerial images, and/or comparison of with coverages or deductibles within their home owners, vehicle, personal articles, and/or other types of insurance.

As one example, from the post-event images, and/or pre-event images, it may be determined that the home owner is in need of debris or tree removal caused from the storm. Such determinations may be made by a remote server, and appropriate monies calculated based upon the insured's actual policy. The monies for debris or tree removal may be automatically deposited or credited to an insured's online insurance-related account or financial account. Alternatively, the monies for debris or tree removal may be deposited, or otherwise credit to an account, after the insured has reviewed and approved an estimated claim generated by the insurance provider remote server, or submitted a manually entered or virtual insurance claim.

As another example, from the post-event drone or aerial images, and/or pre-event drone or aerial images, it may be determined that insured home is a total loss, and/or that the home owner is in need of, or entitled to, additional or temporary living expenses (such as hotel rooms or rental vehicles) provided under their insurance policy. If damage severity analysis of the drone or aerial images indicate that the insured home satisfies certain conditions, monies for a hotel room or other living expenses may be deposited into, or credited to, an financial or other account of the insured to facilitate them having prompt access to the monies during a time of need, such as after the insured reviews a proposed or estimated virtual insurance claim on their mobile device. For instance, some areas may be forced to evacuate due to high winds, storm surge, hurricane, down power lines or loss of electricity, and/or damaged gas lines. Insureds impacted may be forced to spend monies on hotel rooms or other temporary housing. The insurance provider remote server may review hotels in a nearby area out of the path of the storm, and provide recommended hotels to the insured's mobile device for their review and consideration.

The comparison of pre-event and post-event images may also be used to identify potential buildup. For instance, once an actual insurance claim is submitted, it may be compared with an estimated insurance claim generated from comparison of pre-event and post-event drone, aerial, satellite, or other images. If there are severe discrepancies, the insurance claim may be flagged for further review or investigation.

Weather events may be forecasted, as well as their expected path of travel, and/or an estimated strength of storm may be determined for various locations along the storm's projected path. A virtual path associated with the storm may be generated that is defined by GPS location or coordinates. Insured properties within the path of the storm may be identified (such as by comparison of an insured property's GPS location with the GPS coordinates defining the expected path of the storm), as well as insured's, home owners, and/or renters associated with the insured properties. Proactive warnings and recommendations may be sent to those in the path of the storm. For instance, for homes in the path of hurricane, recommendations may include putting up storm shutters or windows; evacuating an area; moving personal articles, vehicles, or boats to temporary storage or otherwise out of the storm's path, etc.

VII. Exemplary Damage Mitigation or Prevention

In one aspect, a computer-implemented method of handling virtual insurance claims or otherwise mitigating damage to insured properties may be provided. The method may include (1) obtaining, via one or more drones, with customer permission, pre-event drone image data of one or more insured properties within a geographical area, the pre-event drone image data including GPS coordinates of the one or more insured properties, and being stored in an insurance provider database; (2) forecasting, via one or more processors (such as at an insurance provider remote server in communication with the insurance provider database), a track or path of a weather event or storm, the forecast including GPS coordinates of the track or path of the weather event or storm; (3) identifying, via the one or more processors, an insured property (a) in the path of the weather event or storm (such as by comparison of GPS coordinates of (i) the insured property, and (ii) the path of the weather event or storm), or (b) within an geographical area potentially impacted by the weather event or storm; (4) generating, via the one or more processors, an electronic message or recommendation for an insured (or homeowner) associated with the insured property in the path of the weather event or storm that is identified by the comparison of GPS coordinates; and/or (5) transmitting, via the one or more processors (or associated transceivers), the electronic message or recommendation to the insured's mobile device to facilitate the insured taking actions or measures that mitigate or prevent damage to the insured property caused by the weather event or storm. The method may include additional, less, or alternate functionality, including that discussed elsewhere herein, and/or may be implemented via one or more local or remote processors, or computer-executable instructions stored on non-transitory computer-readable medium or media.

The electronic message may notify the insured of the impending weather event, and/or an anticipated severity, duration, or path thereof. The electronic message or recommendation may recommend that the insured evacuate the geographical area, and/or move personal belongings to temporary storage to allow the weather event to pass without damaging the personal belongings (such as moving insured personal articles, vehicles, boats, jewelry, antiques, etc. determined from an electronic inventory or schedule of insured assets associated with the insured). The electronic message or recommendation may recommend weather proofing (e.g., covering windows with storm shutters or plywood) an insured home.

The method may also include (1) directing, via the one or more processors, one or more drones to an insured property after the storm passes, such as by sending the one or more drones to the GPS coordinates of the insured property; (2) obtaining and receiving post-event images of the insured property gathered by the one or more drones at the insurance provider remote server (or an associated transceiver), such as by the one or more drones (or associated transceivers) transmitting image data collected via wireless communication or data transmission to the insurance provider remote server; (3) determining, via the one or more processors, whether the insured property is entitled to monies under an associated insurance policy covering the insured property (or related personal articles or vehicles stored within the insured property or home), such as by comparing pre-event and post-event drone image data, and/or an insurance policy coverages covering the insured property; (4) generating, via the one or more processors, an electronic notification to the insured notifying them that they should or may want to submit an insurance claim; and/or (5) transmitting, via the one or more processors (or associated transceivers), the electronic notification via wireless communication or data transmission to the insured's mobile device to facilitate their submission of a virtual insurance claim and a more efficient online customer experience.

The method may further include (1) directing, via the one or more processors, one or more drones to an insured property after the storm passes, such as by sending the one or more drones to the GPS coordinates of the insured property; (2) obtaining and receiving post-event images of the insured property gathered by the one or more drones at the insurance provider remote server (or an associated transceiver), such as by the one or more drones (or associated transceivers) transmitting image data collected via wireless communication or data transmission to the insurance provider remote server; (4) determining, via the one or more processors, an estimated insurance claim based upon comparing pre-event and post-event drone image data, and/or an insurance policy coverages covering the insured property; and/or (4) transmitting, via the one or more processors (or associated transceivers), the estimated insurance claim via wireless communication or data transmission to the insured's mobile device to facilitate their review, approval, and/or submission of a virtual insurance claim via their mobile device and a more efficient online customer experience.

VIII. Exemplary Damage Severity Functionality

In one aspect, a computer-implemented method of handling virtual insurance claims and/or estimating damage severity to insured properties or assets may be provided. The method may include (1) obtaining, via one or more drones, with customer permission, pre-event drone image data of one or more insured properties within a geographical area; (2) receiving, via one or more processors (or transceivers), the pre-event drone image data, such as via wireless communication or data transmission from the one or more drone transceivers; (3) forecasting, via the one or more processors, a track or path of a weather event or storm; (4) identifying, via the one or more processors, an insured property in the path of the weather event or storm (such as by comparison of GPS coordinates of the insured property and the path of the weather event or storm), or within an geographical area potentially impacted by the weather event or storm; (5) obtaining, via one or more drones, post-event images of the insured property; (6) receiving, via one or more processors (or transceivers), the post-event drone image data, such as via wireless communication or data transmission from the one or more drone transceivers; (7) determining, via the one or more processors, a severity of damage to the insured property caused by the weather event by comparing pre-event and post-event drone image data, and/or an insurance policy coverages covering the insured property; and/or (8) providing or electronically transferring, via the one or more processors, monies under the insurance policy covering the insured property to an insured's financial account prior to physical or manual inspection of the damage insured property based upon the severity of damage determined from computing analysis of the pre-event and post-event drone images, the monies related to additional or temporary living expenses coverages (and/or the monies provided or credited after an insured's review or approval of a proposed insurance claim via their mobile device) to facilitate promptly providing financial relief to insured's impacted by weather events.

In another aspect, a computer-implemented method of handling virtual insurance claims or estimating damage severity to insured properties or assets may be determined. The method may include (1) receiving, via one or more processors (or transceivers), pre-event drone image data of one or more insured properties within a geographical area, the pre-event drone image data being captured or collected by one or more drones and with customer consent, and being received via wireless communication or data transmission from the one or more drone transceivers, the pre-event drone image data also including or being associated with GPS coordinates of the one or more insured properties; (2) forecasting, via the one or more processors, a track or path of a weather event or storm based upon up-to-date weather data gathered from one or more sources, the track or path of the weather event or storm being defined by, or associated with, GPS coordinates; (3) identifying, via the one or more processors, an insured property in the path of the weather event or storm (such as by comparison of GPS coordinates of the insured property and the path of the weather event or storm), or within an geographical area potentially impacted by the weather event or storm; (4) obtaining, via one or more drones, post-event images of the insured property; (5) receiving, via one or more processors (or transceivers), post-event drone image data of the one or more insured properties within the geographical area, the post-event drone image data being captured or collected by one or more drones that are directed into the aftermath of the weather event or storm by wireless communication sent from the one or more processors (or transceivers), the post-event drone image being sent from the one or more drone transceivers via wireless communication or data transmission; (6) determining, via the one or more processors, a severity of damage (and/or an estimated insurance claim) to the insured property caused by the weather event or storm by comparing the pre-event and post-event drone image data, and/or an insurance policy coverages covering the insured property; and/or (7) providing or electronically transferring, via the one or more processors, monies under the insurance policy covering the insured property to an insured's financial account prior to physical or manual inspection of the damage insured property based upon the severity of damage determined from computing analysis of the pre-event and post-event drone images, the monies related to additional or temporary living expenses coverages (and/or the monies provided or credited after an insured's review or approval of a proposed insurance claim via their mobile device) to facilitate promptly providing financial relief to insured's impacted by weather events.

The method may also include (8) generating, via the one or more processors, an electronic message or recommendation for an insured associated with the insured property in the path of the weather event or storm; and/or (9) transmitting, via the one or more processors (or associated transceivers), the electronic message or recommendation to the insured's mobile device prior to the storm arriving via wireless communication or data transmission to facilitate the insured taking actions or measures that mitigate or prevent damage to the insured property caused by the weather event or storm. The foregoing methods may include additional, less, or alternate functionality, including that discussed elsewhere herein, and/or may be implemented via one or more local or remote processors, or computer-executable instructions stored on non-transitory computer-readable medium or media.

IX. Exemplary Electronic Notification Generation

In one aspect, a computer-implemented method of handling virtual insurance claims and/or generating electronic notifications may be provided. The method may include (1) obtaining, via one or more drones, with customer permission, pre-event drone image data of one or more insured properties within a geographical area, the pre-event drone image data including GPS coordinates of the one or more insured properties; (2) receiving, via one or more processors (such as an insurance provider remote server or an associated transceiver), the pre-event drone image data (such as via wireless communication or data transmission) and storing the pre-event drone image data in a memory unit or database local to the insurance provider remote server; (3) receiving, via the one or more processors, weather data or otherwise accessing weather data, such as via the internet or a data stream of weather data; (4) forecasting, via the one or more processors, a track or path of a weather event or storm based upon the weather data, the track or path being associated with, or defined by, GPS coordinates; (5) identifying, via the one or more processors, an insured property in the path of the weather event or storm (such as by comparison of GPS coordinates of the insured property and the path of the weather event or storm), or within an geographical area potentially impacted by the weather event or storm; (6) generating, via the one or more processors, an electronic message or recommendation for an insured associated with the insured property in the path of the weather event or storm; and/or (7) transmitting, via the one or more processors (or associated transceivers), the electronic message or recommendation to the insured's mobile device to facilitate the insured taking actions or measures that mitigate or prevent damage to the insured property caused by the weather event or storm. The method may include additional, less, or alternate functionality, including that discussed elsewhere herein, and/or may be implemented via one or more local or remote processors, or computer-executable instructions stored on non-transitory computer-readable medium or media.

For instance, the electronic message may notify the insured of the impending weather event. The electronic message or recommendation may recommend that the insured evacuate the geographical area, or move personal belongings to temporary storage to allow the weather event to pass without damaging the personal belongings (such as insured personal articles, vehicles, or other items listed in an electronic inventory or schedule). The electronic message or recommendation may recommend weather proofing an insured home.

The method may also include obtaining, via one or more drones, post-event images of the insured property, and receiving the post-event at the one or more processors (or an associated transceiver), such as via wireless communication or data transmission; determining, via the one or more processors, whether the insured property is entitled to monies under an associated insurance policy covering the insured property (or related personal articles or vehicles stored within the insured property or home), such as by comparing pre-event and post-event images and/or an insurance policy coverages covering the insured property; generating, via the one or more processors, an electronic notification to the insured notifying them that they should or may want to submit an insurance claim; and/or transmitting, via the one or more processors (or associated transceivers), the electronic notification via wireless communication or data transmission to the insured's mobile device to facilitate their review, approval, and/or submission of a virtual insurance claim and a more efficient online customer experience.

X. Exemplary Damage Severity Estimation

In one aspect, a computer-implemented method of estimating the severity of damage to insured assets caused by a storm may be determined. The method may include (1) obtaining, via one or more drones, with customer permission, pre-event drone image data of one or more insured properties within a geographical area, and transmitting the drone image collected to one or more processors (such as an insurance provider remote server) via wireless communication or data transmission from the one or more drone transceivers; (2) forecasting, via the one or more processors, a track or path of a weather event or storm; (3) identifying, via the one or more processors, an insured property in the path of the weather event or storm (such as by comparison of GPS coordinates of the insured property and the path of the weather event or storm), or within an geographical area potentially impacted by the weather event or storm; (4) obtaining, via one or more drones, post-event images of the insured property, and transmitting the drone image collected to one or more processors (or associated transceivers) via wireless communication or data transmission from one or more drone transceivers; (5) determining, via the one or more processors, a severity of damage (and/or an estimated or proposed insurance claim) to the insured property caused by the weather event by comparing pre-event and post-event drone images, and/or an insurance policy coverages covering the insured property; and/or (6) providing or electronically transferring, via the one or more processors, monies under the insurance policy covering the insured property to an insured's financial account prior to physical or manual inspection of the damage insured property based upon severity of damage determined from computing analysis of the pre-event and post-event drone images, the monies related to additional or temporary living expenses coverages (and/or the monies provided after an insured's review or approval of a proposed insurance claim via their mobile device) to facilitate promptly providing financial relief to insured's impacted by weather events.

The method may include generating, via the one or more processors, an electronic message or recommendation for an insured associated with the insured property in the path of the weather event or storm; and/or transmitting, via the one or more processors (or associated transceivers), the electronic message or recommendation to the insured's mobile device via wireless communication or data transmission to facilitate the insured taking actions or measures that mitigate or prevent damage to the insured property caused by the weather event or storm. The method may include additional, less, or alternate functionality, including that discussed elsewhere herein, and/or may be implemented via one or more local or remote processors, or computer-executable instructions stored on non-transitory computer-readable medium or media.

XI. Additional Considerations

With the foregoing, an insurance customer may opt-in to a rewards, insurance discount, or other type of program. After the insurance customer provides their affirmative consent, an insurance provider drone or UAV (Unmanned Aerial Vehicle) may collect image data of insured assets before, during, and/or after an insurance-related event, including those events discussed elsewhere herein. In return, risk averse vehicle or home owners may receive discounts or insurance cost savings related to home, auto, personal articles, and other types of insurance from the insurance provider.

In one aspect, drone or UAV data, and/or other data, including the types of data discussed elsewhere herein, may be collected or received by an insurance provider remote server, such as via direct or indirect wireless communication or data transmission from a drone or UAV, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon (a) following recommendations, such as recommendations based upon an impending or approaching weather event; and/or (b) data that reflects low risk behavior and/or technology (such as smart home technology) that mitigates or prevents risk to (i) insured assets, such as vehicles or homes, and/or (ii) home occupants.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The foregoing detailed description illustrates embodiments of the disclosure by way of example and not by way of limitation. It is contemplated that the disclosure has general application to notifying policyholders about weather events and property loss.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A weather event computing device for transmitting at least one weather notification to a policyholder, the weather event computing device in communication with a weather reporting device and at least one unmanned aerial vehicle, the weather event computing device comprising a processor and a memory, wherein the processor is programmed to:
   receive, from a weather reporting device, weather data for a region that includes at least a candidate property associated with the policyholder;
   determine from the weather data that the region is expected to experience a weather event that has yet to occur;
   determine the candidate property associated with the policyholder located within the region is expected to experience the weather event;
   in response to determining the candidate property is expected to experience the weather event, transmit a first notification to the policyholder before the weather event occurs advising the policyholder that the candidate property is likely to experience the weather event;
   in response to determining the candidate property is expected to experience the weather event, transmit a first instruction to the at least one unmanned aerial vehicle to navigate to a location of the candidate property based upon coordinates of the candidate property and to capture a pre-event media file of the candidate property, the pre-event media file including an image or video of the candidate property before the weather event has occurred;
   receive, from the at least one unmanned aerial vehicle, the pre-event media file;
   determine, after the weather event has occurred, the candidate property was impacted by the weather event;
   in response to determining the candidate property was impacted by the weather event, transmit a second instruction to the at least one unmanned aerial vehicle to navigate to the location of the candidate property based upon the coordinates of the candidate property and to capture a post-event media file of the candidate property, the post-event media file including an image or video of the candidate property after the weather event has occurred;
   receive, from the at least one unmanned aerial vehicle, the post-event media file;
   compare the pre-event media file to the post-event media file to determine whether the candidate property was damaged by the weather event;
   when the candidate property is determined to be damaged by the weather event, determine, based upon the comparison, a severity level of damage to the candidate property;
   in response to determining that the severity level is at or above a predefined level indicating the candidate property is at least partially inaccessible or uninhabitable based upon the comparison, transmit a second notification to the policyholder after the weather event has occurred advising the policyholder that the candidate property was damaged by the weather event and is at least partially inaccessible or uninhabitable; and
   in response to determining that the severity level is below the predefined threshold based upon the comparison, do not transmit the second notification to the policy holder.

2. The weather event computing device of claim 1, wherein the candidate property includes real or personal property, including one or more of a residence, an automobile, a boat, a plane, and another vehicle.

3. The weather event computing device of claim 1, wherein the processor is further programmed to identify the candidate property as likely being impacted by the weather event.

4. The weather event computing device of claim 1, wherein the processor is further programmed to receive, from the weather reporting device, current weather data, predicted weather data, and weather warnings.

5. The weather event computing device of claim 1, wherein the pre-event and post-event media files are stored in an account data file of the policyholder within the memory, and are accessible by the policyholder with proper security permission.

6. The weather event computing device of claim 1, wherein the processor is further programmed to include additional information in the second notification, the additional information including a direct link to an online account of the policyholder, wherein the online account includes the pre-event and post-event media files of the candidate property.

7. The weather event computing device of claim 6, further comprising an online account module configured to generate the online account specifically for the policyholder, wherein the online account includes one or more of emergency contact information, one or more images of the candidate property, one or more videos of the candidate property, a link to initiate an insurance claim online, a link to contact an insurance agent, and insurance policy information.

8. The weather event computing device of claim 7, wherein the online account module is further configured to generate the online account to include an option for the policyholder to request that funds be automatically deposited into a bank account.

9. The weather event computing device of claim 8, wherein an amount of funds available to be automatically deposited into the bank account depends upon the severity level.

10. The weather event computing device of claim 7, wherein the weather event computing device is further in communication with an insurance computing device, the insurance computing device comprising at least one processor and a memory, wherein the insurance computing device is configured to:
    receive insurance claim data from the online account module, wherein the insurance claim data is generated by the online account module in response to an insurance claim initiated by the policyholder, using the online account, for a property loss to the candidate property resulting from the weather event;
    receive the pre-event and post-event media files of the candidate property and the severity level from the online account module; and
    process the insurance claim data to assess the insurance claim and determine an amount payable to the policyholder based at least in part on the pre-event and post-event media files of the candidate property and the severity level.

11. The weather event computing device of claim 10, wherein the insurance computing device is further configured to determine whether an insurance policy associated with the candidate property is eligible for at least one of a policy adjustment and an insurance reward offer.

12. The weather event computing device of claim 11, wherein the insurance computing device is further configured to apply the at least one eligible adjustment and insurance reward to the insurance policy.

13. The weather event computing device of claim 11, wherein the insurance computing device is further configured to transmit a notification to the policyholder if the insurance policy is determined to be eligible for the at least one of the policy adjustment and the insurance reward offer.

14. The weather event computing device of claim 1, wherein the weather event is one or more of a hurricane, earthquake, a storm, hail, a tornado, a wildfire, a flood, ice, wind, or snow.

15. The weather event computing device of claim 1, wherein the processor is further programmed to transmit the first and second notifications via at least one of e-mail, text message, and automated phone call.

16. The weather event computing device of claim 1, wherein the processor is further programmed to generate a map displaying locations of candidate properties potentially impacted, or impacted by the weather event.

17. The weather event computing device of claim 16, wherein the processor is further programmed to display on the map only the locations of candidate properties assigned to a predefined insurance agent.

18. A computer-implemented method for transmitting at least one weather notification to a policyholder, said method implemented using a weather event computing device including at least one processor in communication with a memory, the weather event computing device in communication with a weather reporting device, at least one unmanned aerial vehicle, and an insurance computing device, said method comprising:
 receiving, from the weather reporting device, weather data for a region that includes at least one candidate property associated with the policyholder;
 determining from the weather data that the region is expected to experience a weather event that has yet to occur;
 determining at least one candidate property associated with the policyholder located within the region is expected to experience the weather event;
 in response to determining the candidate property is expected to experience the weather event, transmitting a first notification to the policyholder before the weather event occurs advising the policyholder that the candidate property is likely to experience the weather event;
 in response to determining the candidate property is expected to experience the weather event, transmitting a first instruction to the at least one unmanned aerial vehicle to navigate to a location of the candidate property based upon coordinates of the candidate property and to capture a pre-event media file of the candidate property, the pre-event media file including an image or video of the candidate property before the weather event has occurred;
 receiving, from the at least one unmanned aerial vehicle, the pre-event media file;
 determining, after the weather event has occurred, the candidate property was impacted by the weather event;
 in response to determining the candidate property was impacted by the weather event, transmitting a second instruction to the at least one unmanned aerial vehicle to navigate to the location of the candidate property based upon the coordinates of the candidate property and to capture a post-event media file of the candidate property, the post-event media file including an image or video of the candidate property after the weather event has occurred;
 receiving, from the at least one unmanned aerial vehicle, the post-event media file;
 comparing the pre-event media file to the post-event media file to determine whether the candidate property was damaged by the weather event;
 when the candidate property is determined to be damaged by the weather event, determining, based upon the comparison, a severity level of damage to the candidate property;
 in response to determining that the severity level is at or above a predefined level indicating the candidate property is at least partially inaccessible or uninhabitable based upon the comparison, transmitting a second notification to the policyholder after the weather event has occurred advising the policyholder that the candidate property was damaged by the weather event and is at least partially inaccessible or uninhabitable; and
 in response to determining that the severity level is below the predefined threshold based upon the comparison, transmitting no second notification to the policy holder.

* * * * *